(12) United States Patent
Liu

(10) Patent No.: US 7,879,294 B2
(45) Date of Patent: Feb. 1, 2011

(54) METHOD AND APPARATUS FOR FINE SOLIDS RECYCLE

(75) Inventor: Gouhai Liu, Birmingham, AL (US)

(73) Assignee: Synthesis Energy Systems, Inc., Houston, TX (US)

( * ) Notice: Subject to any disclaimer, the term of this patent is extended or adjusted under 35 U.S.C. 154(b) by 289 days.

(21) Appl. No.: 12/111,767

(22) Filed: Apr. 29, 2008

(65) Prior Publication Data

US 2009/0269260 A1    Oct. 29, 2009

(51) Int. Cl.
| | | |
|---|---|---|
| F27B 15/08 | (2006.01) | |
| B01J 10/00 | (2006.01) | |
| B01J 8/02 | (2006.01) | |
| B01J 23/90 | (2006.01) | |

(52) U.S. Cl. .................. 422/147; 422/142; 422/144; 422/211; 422/216; 422/218; 422/220; 422/223

(58) Field of Classification Search ............. 422/213, 422/218, 223, 228, 142, 144, 147, 148, 191, 422/192, 211, 216, 220
See application file for complete search history.

(56) References Cited

U.S. PATENT DOCUMENTS

| | | | | |
|---|---|---|---|---|
| 4,948,569 A | * | 8/1990 | Martin et al. | ............... 422/142 |
| 5,320,744 A | * | 6/1994 | Steffens | ...................... 208/113 |
| 7,081,229 B2 | * | 7/2006 | Huziwara et al. | ........... 422/144 |
| 2004/0208801 A1 | * | 10/2004 | Huziwara et al. | ........... 422/147 |

* cited by examiner

*Primary Examiner*—Walter D Griffin
*Assistant Examiner*—Huy-Tram Nguyen
(74) *Attorney, Agent, or Firm*—Kening Li; Pinsent Masons LLP

(57) ABSTRACT

A fine solids recycle apparatus for a fluidized bed reactor comprises an eductor connected to a dipleg extending from a cyclone connected to the reactor, wherein the fine solids particles are removed from the dipleg, mixed with an eductor gas to form an eductor gas-fine solids particles mixture, which allows the return of the fine solids particles to the fluidized bed region, whereby the fine solids is further reacted in the fluidized region to improve reaction efficiency.

11 Claims, 3 Drawing Sheets

METHOD AND APPARATUS FOR FINE SOLIDS RECYCLE

FIELD OF THE INVENTION

The present invention is related to a method and apparatus for collecting and recycling fine solids in a fluidized bed reactor.

BACKGROUND OF THE INVENTION

Fluidized bed reactors are commonly used for reacting a solid phase reactant with a gas phase reactant. The direct product from the fluidized bed region of such reactors, often referred to as the exit gas stream, contains both a product gas, as well as solids which contains un-reacted solid phase reactant(s) or reaction products (ashes). These solids are in the form of particles of various sizes. In order to increase the usage efficiency of the solid phase reactant, and to reduce waste ash volume, one or more stages of cyclones (multiple-stage cyclone) are often used in such fluidized bed reactors.

In a multiple-stage cyclone set up, a first stage cyclone may collect large particles and recycle the solids to the fluidized beds through a suitable dipleg with various mechanical or non-mechanical valves. Generally, however, this first stage cyclone is not sufficient or effective in removing fine solid particles. Thus, after the first stage cyclone, there is generally at least another stage cyclone to collect the fine particles escaped from the first stage cyclone. If the fluidized bed is operated at a temperature of below 800° C., it is common practice to use the cyclone dipleg insert into the fluidized bed as those in Fluid Catalytic Cracking units; see e.g. U.S. Pat. Nos. 3,652,446, 4,220,623 and. 4,578,183.

In cases where the fluidized bed is operated at above 800° C. or if oxidization atmosphere exists in the bed, it becomes difficult to use a dipleg insert into the bed. That is because of the tendency of the bed materials to form clinker inside and on the surface of the dipleg.

It is also critical to prevent the gas from reverse flowing from the fluidized bed through the cyclone dipleg to the cyclone. Fluid Catalytic Cracker (FCC) in the refinery industry, for example, uses various flapper valves on the end of the dipleg to prevent the gas from reverse flowing back into the dipleg. Flapper valves can seal the gas from reverse flowing while allow the solids to flow out of the dipleg. The dipleg with a flapper valve in the end will allow the dipleg and the cyclone to be installed inside the fluidized bed. It is prohibitively expensive, however, to use flapper valves at high temperatures, due to the need to use materials resistant to high temperatures. For a fluidized bed combustor or a gasifier, the bed temperatures can be as high as 1050° C., at which most metals would lose strength. In fact, it is practically impossible to use flapper valves.

Another method to seal the dipleg and prevent reverse gas flow is to bury the solids exit end of the dipleg inside the fluidized bed. However, elaborate designs are required to have the dipleg inserted into such a bed due to stringent requirements of the materials of construction. Therefore, it is a common practice to have the dipleg introduced to the gasifier from the outside. In this manner, the interconnection part of the solids inlet to the fluidized bed and the dipleg will be lined with refractory, which can tolerate higher temperatures.

A particular application of the fluidized bed is a fluidized bed gasifier for converting carbonaceous materials such as coal into fuel or synthesis gas. In these gasifiers, after the first stage cyclone, the particle size of the solids remaining in the gas generally is less than about 100 micron, with a mass mean diameter of about 15 to about 20 micron. These particles are generally cohesive and difficult to be fluidized, because in order to effectively return these solids back to the gasifier, it is highly desired to have the particles behave like fine sand so that they will flow like liquid; the cohesive particles from the second stage cyclone, however, behave much like wheat flour, forming lumps and many channels without being fluidized. Therefore, it is very difficult to recycle the solids back to the gasifier.

The cohesive nature of the solids creates another difficulty for solids recycling. Ordinarily, solids collected in the cyclones flows in free fall down the leg, forming a dense column in the bottom section of the dipleg. The dense phase of solids when fluidized can form a static head. which is necessary for the solids to move from the bottom of the cyclone dipleg, a relatively low pressure region, to the fluidized bed region, a relatively high pressure region. The downward flow of solids also maintains the seal in the system owing to the existence of the column of solids. The cohesive solid particles in the cyclone dipleg, however, cannot establish a static head. This is particularly true with regard to the particles collected in the secondary stage cyclone. Therefore, the solids collected by the second stage cyclone dipleg cannot be naturally recycled to the fluidized bed due to the cohesive particles in the dipleg.

Due to the above difficulties in recycling fine particle solids to the gasifier, commercial fluidized bed gasifiers generally do not use a second stage cyclone. As a result, the content of un-utilized solid reactant, for example, carbon, in the solids from the exit of the first stage cyclone cannot be utilized, resulting in low gasifier carbon conversion rate. For example, the rate of gasifier carbon conversion utilizing existing technology is only around 80-85% even with high reactive coals such as lignite and subbituminous coals. The carbon loss is a serious economic disadvantage, as well as an environmental hazard due to large amount of ash discharged. Furthermore, the carbon-containing fine solids are lighter, generally about 4-5 times higher in volume than water per unit mass, making it very difficult to handle and be further utilized. Once the carbon in the solids is more fully utilized, the final solids particles would have a higher bulk density and much easier to wet and handle.

Accordingly, there is a need for a new apparatus that can return solids from a low pressure to a high pressure region, thereby improving carbon conversion rate of a fluidized bed gasifier.

SUMMARY OF THE INVENTION

The present invention provides an innovative solution to the problems related to recycling fine particles from raw product gas in a fluidized bed reactor. In one embodiment, the present invention provides a fine solids recycle apparatus for a fluidized bed reactor, wherein the fluidized bed reactor comprises a fluidized bed region encased in a reaction vessel, at least one cyclone in fluid communication with the fluidized bed region for receiving a first gas-solid mixture which comprises fine solids particles, where the cyclone is connected to a dipleg through which the fine solids particles separated from the gas-solid mixture in the cyclone are collected, the apparatus comprising an eductor connected to the dipleg, wherein the fine solids particles are removed from the dipleg, mixed with an eductor gas to form an eductor gas-fine solid particles mixture, which allows the return of the fine solids particles to the fluidized bed region. Suitable eductor gas or motive gas for the present invention may be $N_2$, $CO_2$, air, steam, $O_2$, or a mixture thereof.

In another embodiment, in the fine solids recycle apparatus of the present invention, the dipleg is arranged vertically, and a horizontal leg is provided to connect the dipleg with a solids inlet of the eductor. The horizontal leg serves to regulate gas and solids flow from the dipleg to the eductor to prevent gas in the eductor from reverse-flowing to the cyclone.

The horizontal leg comprises a first end that is connected to the dipleg and a second end that is away from the dipleg. In one embodiment, in the fine solids recycle apparatus of the present invention, a vertical section is further provided between the second end of the horizontal leg and the solids inlet of the eductor. This vertical section further allows better control of gas and solids flow in the desired direction.

The fine solids recycle apparatus in another embodiment may further comprise one or more aeration nozzles downstream of the eductor to facilitate return of the eductor gas-fine solid particle mixture to the fluidized bed region.

The present invention is particularly suitable for returning or recycling fine particles having a size of less than about 100 microns, especially fine solids having a mass mean diameter of about 15 to about 20 microns.

The present invention further provides a fluidized bed reactor comprising a fine solids recycle apparatus described above. In preferred embodiment, the fluidized bed reactor according to the present invention is a fluidized bed coal gasifier.

In preferred embodiment, the fluidized bed reactor of the present invention comprises two or more stages of cyclones, wherein an eductor is provided for each stage of cyclone. In another embodiment, the fluidized bed reactor of the present invention comprises two or more cyclones, wherein an eductor is provided for a second stage cyclone, and any cyclone subsequent to the second stage cyclone.

DETAILED DESCRIPTION OF THE INVENTION

The present invention provides an apparatus useful in a fluidized bed reactor, as well as a related method, for collecting and recycling fine solids.

Figure 1:
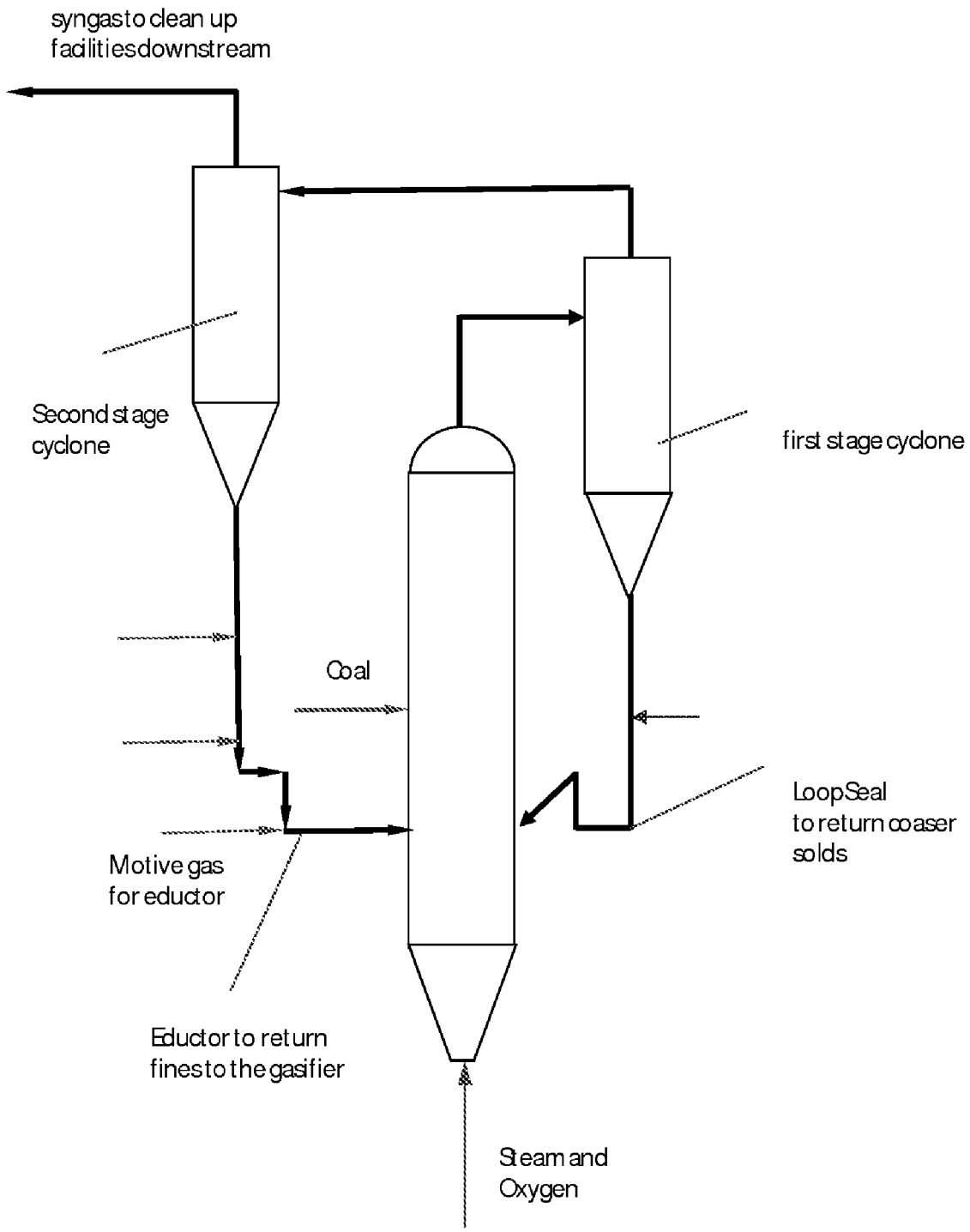
FIG. 1 is a schematic diagram showing an gasifier assembly with a first and second stage cyclones to recycle solids back to the gasifier.

The relative positions of various major components of a fluidized bed reactor system that comprises a fine solids recycle apparatus of the present invention are given in FIG. 1.

In one embodiment, the preset invention provides a method and an apparatus to return fine solid particles less than about 100 micron in size from a cyclone collector, which is at a slightly lower pressure than the fluidized bed region of a fluidized bed reactor, back to the fluidized bed region.

Figure 2:
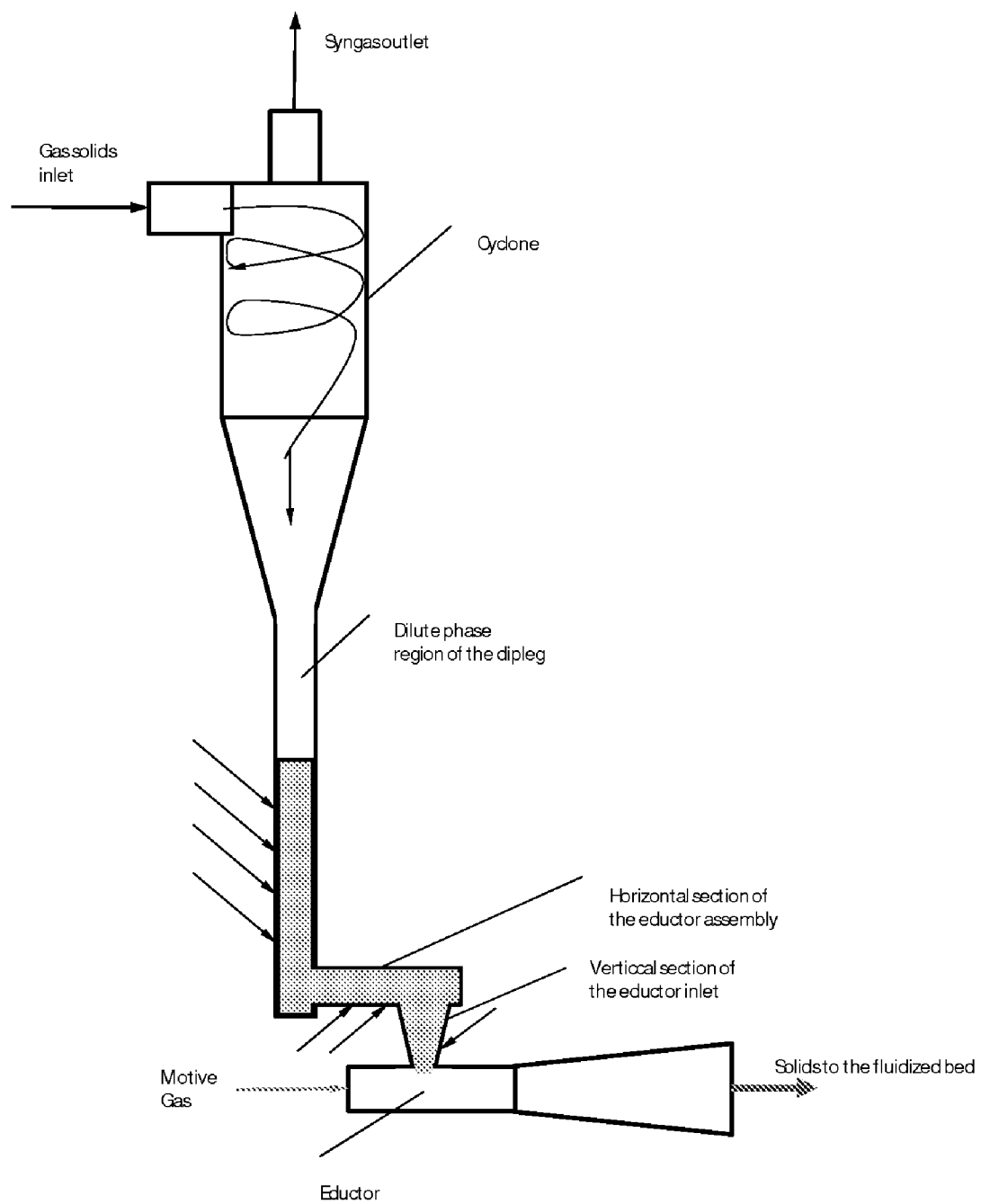
FIG. 2 is a diagram showing one embodiment of the present invention.

The fine solids recycle apparatus of the present invention, in one embodiment, comprises, as shown in FIG. 2, a cyclone, which collects solids entrained in the gas stream, a dipleg, which receives solids from and is preferably positioned below the cyclone; and an eductor in fluid communication with the exit of the dipleg.

A cyclone is a device that utilizes the centrifugal force to separate a fluid from particles entrained therein. A conventional cyclone in a fluidized bed reactor is used to separate the gas and solids. A cyclone has at least one tangential inlet for the solids laden gas stream, an outlet for the gas with reduced solids loading and another outlet for the solids collected. For most conventional cyclones, as shown in FIG. 2, the gas-solids inlet is typically located on the side wall and the gas outlet in the top and the solids outlet at the bottom.

The cyclone may comprise a cylindrical portion, and a cone shaped portion, connected to the cylindrical portion. The top end (solids inlet) of the dipleg is connected to the narrow end (solids exit) of the cone shaped portion of the cyclone.

In one embodiment, a dipleg of the present invention is a suitable pipe having an inlet connected to the solids exit of the cyclone, and an outlet connected to a horizontal pipe. This horizontal pipe eventually feeds the solids to an eductor, which in turn is connected to the solids exit pipe that returns the solids to the fluidized bed region of the reactor. Because the pressure in the fluidized bed region is higher than that of the flow in the cyclone, without the eductor, the pressure at the dipleg inlet would be lower than at the exit of the dipleg.

It is well known that fluids do not flow from a low pressure region to a high pressure region, certain specific design is needed. As discussed above, the dipleg is intended to accomplish the task to let gas solids mixture to flow from a low pressure to a high pressure region by the static head established by the fluidized materials in the dipleg. For the fines in the second stage cyclone dipleg, however, the static head is difficult to establish because the cohesive particles cannot be fluidized by a conventional method as has been pointed out above. Since fluidization is the requirement for a column of solids to establish a static head, the particles in the second stage cyclone dipleg are incapable of establishing a static head and therefore cannot flow out of the dipleg without external aids.

In one embodiment, the present invention utilizes an eductor to overcome the above difficulties. An eductor is a device that has a first inlet ("motive fluid inlet") for a high pressure fluid, also called the motive fluid; a second inlet for the solids to be discharged ("solids inlet"), and an outlet for the discharge of the motive fluid mixed with the solids. According to the Bernoulli principle, the loss of kinetic energy by the motive gas will generate a low pressure in the solids inlet region so that the solids will be induced into the eductor, and then be forced out of the outlet under pressure created by the injection of the motive gas.

Figure 3:
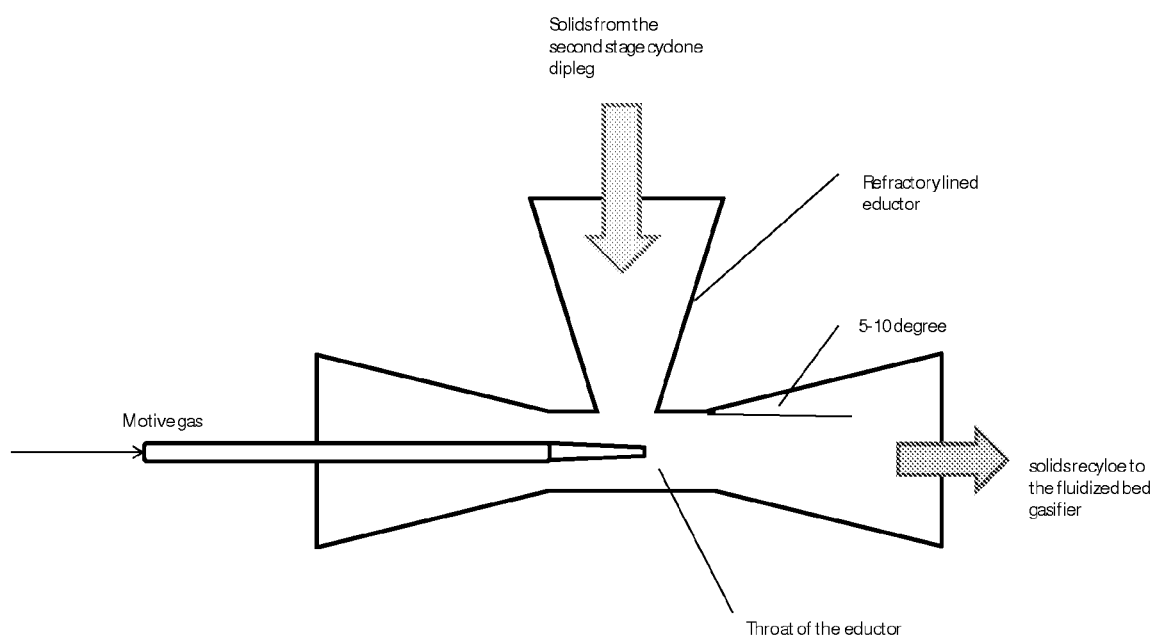
FIG. 3 is a diagram showing the structure of the refractory lined eductor for high temperature applications.

As shown in FIGS. 2 and 3, in a preferred embodiment, the eductor comprises a throat region which is narrower than the downstream portion of the pipe that leads to the outlet. This increased pipe width downstream of the throat region reduces the speed of the gas stream inside the pipe from the throat region to the discharge, thereby reducing pressure loss due to friction and resulting in lower pressure requirement for the motive gas.

According to one embodiment of the present invention, when the gas solids mixture enters the cyclone tangentially from the side wall, the centrifugal force will force the solids towards the side wall. Since the centrifugal acceleration is roughly equal to the square of entrance tangential velocity divided by the radius of the cyclone, the centrifugal force for the same particles will be normally 100 times higher than gravity for the same particle mass. As a result, particles as small as 5 microns can be spun toward the wall. In the wall region, the fluid velocity is low and the solids are collected in the wall region, and then flow downward under gravity towards the bottom outlet.

In one embodiment, the bottom of the cyclone cone is connected to the dipleg as shown in FIG. 2. Solids in the upper part of the dipleg are in a dilute state ("dilute phase"), and are able to fall along the wall under gravity. As the solids are collected toward the lower part of the dipleg, the solids slow down and coalesce into a dense phase in the dipleg. The dense phase of fines particles, although unable to form a static head on their own, can in accordance with the present invention, move out of the dipleg under both gravity and the suction power of the eductor.

The gas with reduced solids loading will flow to the center of the cyclone and finally to the outlet at the top due to the lower pressure at that outlet.

Motive Gas: The motive gas may be $N_2$, $CO_2$, steam or a mixture thereof. Preferably, the motive gas is a gas used as the gasification agent in the gasifier to generate syngas. The source for the high pressure gas stream motive fluids is generally from a compressor or a pump. $N_2$ from a nitrogen compressor can be used to educt the solids for a fluidized bed gasifier. The negative pressure generated or desired can be calculated using methods well-known in the art (see e.g., Parker, J., Boggs, J., Blick, E., Introduction to fluid mechanics and heat transfer, Addison-Wesley, 1970, pp 163). In one embodiment, the suction pressure is preferably about 20-30 kPa and the discharge pressure 35-70 kPa. The motive gas pressure is preferably 400-600 kPa higher than the gasifier operating pressure.

As discussed above, due to their cohesive nature the solids in the dipleg cannot establish a static head, and as such cannot be recycled from a low pressure region to a high pressure region using a conventional dipleg alone. According to the present invention, the use of an eductor creates, due to the Venturi effect, low pressure at the entrance region of the eductor, so that the pressure at the entrance to the eductor is lower than that at the bottom of the dipleg connected to the cyclone. As a result, the solids flow away from the dipleg to the eductor is facilitated as the flow is from a relatively high pressure region to a relatively low pressure region.

The high pressure of the motive gas, on the other hand, ensures that the pressure in the eductor outlet is higher than that in the fluidized bed region. This high pressure, combined with the kinetic energy of the motive gas, helps convey the solids to the fluidized bed region.

In one embodiment, the fine solids recycle apparatus of the present invention further comprises a horizontal leg, which links the eductor, more precisely the entrance of the eductor, to the dipleg. The horizontal leg adds additional resistance to the gas and solids flow to prevent large amount of gas from being delivered from the cyclone to the gasifier.

The horizontal leg also prevents the motive gas from being blown back (reverse flow) to the cyclone dipleg upwards, upsetting the cyclone operation whenever there is a sudden pressure fluctuation in the fluidized bed. With the additional resistance from the horizontal leg, the solids in the horizontal section prevent the gas from reverse-flowing from the eductor to the cyclone. Without the horizontal leg, the negative entrance pressure generated by the eductor may also suck dilute gas from the cyclone directly to the gasifier.

The length of horizontal leg is preferably about 4-12 times of the diameter of the horizontal pipe, which is similar to that of the lower end of the dipleg. As will be readily recognized by those skilled in the art, if the horizontal leg is too long, it will require too much motive gas pressure in order for the solids to flow forward; while too short a horizontal leg is insufficient to prevent the gas from reverse flowing upwards to the cyclone.

In one embodiment, the solids inlet to the eductor further comprises a vertical section, as shown in FIG. 2, which connects the horizontal leg described above. The height of the vertical section is preferably about 6-8 times of the inner diameter of the pipe at the entrance to the eductor.

In certain embodiments of the invention, aeration nozzles may be used to facilitate the solids flow from the cyclone to the fluidized bed. The aeration nozzles are arranged according to the predicted solids flow rate and the bed height in the fluidized bed where the solids will return.

In one embodiment, the aeration nozzles in the vertical section of the dipleg is generally about 1.5 to 2 meters apart and the inner diameter of the aeration nozzles is generally about 10-40 mm. These aeration nozzles are also inclined towards the flow direction with the slant angles of about 30 to 60 degrees from the horizontal line. The aeration nozzles in the horizontal section are 0.3 to 0.5 meter a part and the same diameter as those of the vertical nozzles. The velocity of the gas inside the nozzle is between about 2.5 to 5 m/s. For a dipleg with an inner diameter of less than about 0.5 m, one nozzle is generally sufficient at a given location for the entire circumference. If the inner diameter of the dipleg is more than 0.5 m, then more than one aeration nozzle may be installed along the circumference for a given elevation or a location.

The invention achieves a high carbon conversion rate and reduces the volume of the fly ash from the gasifier.

The present invention is suitable for any second or a third stage cyclone for a fluidized bed gasifier and other fluidization systems where multistage cyclones are required and fine cohesive materials need to be returned to the fluidized bed under high pressure and temperature. Fluidized bed combustor for example can use an eductor to recycle solids back to the bed, as well as a fluidized bed catalytic cracker regenerator.

What is claimed is:

1. A fine solids recycle apparatus for a fluidized bed reactor, wherein the fluidized bed reactor comprises a fluidized bed region encased in a reaction vessel, at least one cyclone in fluid communication with the fluidized bed region for receiving a first gas-solid mixture which comprises fine solids particles, where the cyclone is connected to a dipleg through which the fine solids particles separated from the gas-solid mixture in the cyclone are collected, the apparatus comprising: an eductor connected to the dipleg, wherein the fine solids particles are removed from the dipleg, mixed with an eductor gas to form an eductor gas-fine solid particles mixture, which allows the return of the fine solids particles to the fluidized bed region;
wherein the dipleg is arranged vertically, and a horizontal leg is provided to connect the dipleg with a solids inlet of the eductor; wherein gas and solids flow from the dipleg to the eductor is regulated to prevent gas in the eductor from reverse-flowing to the cyclone.

2. The fine solids recycle apparatus according to claim 1, wherein the horizontal leg comprising a first end that is connected to the dipleg and a second end that is away from the dipleg, wherein a vertical section is provided between the second end of the horizontal leg and the solids inlet of the eductor.

3. The fine solids recycle apparatus according to claim 1, wherein one or more aeration nozzles are provided downstream of the eductor to facilitate return of the eductor gas-fine solid particle mixture to the fluidized bed region.

4. The fine solids recycle apparatus according to claim 1, wherein the eductor gas is $N_2$, $CO_2$, air, steam, $O_2$, or a mixture thereof.

5. The fine solids recycle apparatus according to claim 1, wherein the fine particles have a size of less than about 100 microns.

6. The fine solids recycle apparatus according to claim 5, wherein the fine particles have a mass mean diameter of about 15 to about 20 microns.

7. A fluidized bed reactor comprising a fine solids recycle apparatus of claim 1.

8. The fluidized bed reactor according to claim 1, wherein the fluidized bed reactor is a fluidized bed coal gasifier.

9. The fluidized bed reactor according to claim 1, wherein the reactor comprises two or more stages of cyclones.

10. The fluidized bed reactor according to claim 8, wherein an eductor is provided for each stage of cyclone.

11. The fluidized bed reactor according to claim 8, wherein an eductor is provided for a second stage cyclone, or a stage subsequent to the second stage cyclone.

* * * * *

UNITED STATES PATENT AND TRADEMARK OFFICE
CERTIFICATE OF CORRECTION

PATENT NO. : 7,879,294 B2  
APPLICATION NO. : 12/111767  
DATED : February 1, 2011  
INVENTOR(S) : Guohai Liu Page 1 of 1

It is certified that error appears in the above-identified patent and that said Letters Patent is hereby corrected as shown below:

The patentee hereby respectfully requests that the front page of the Letters Patent be corrected as follows:

(75) Inventor: Guohai Liu, Birmingham, AL (US)

Signed and Sealed this  
Twelfth Day of April, 2011

David J. Kappos  
*Director of the United States Patent and Trademark Office*